US008879095B2

(12) United States Patent
Ikegaya et al.

(10) Patent No.: US 8,879,095 B2
(45) Date of Patent: Nov. 4, 2014

(54) IMAGE FORMING SYSTEM, INFORMATION FORMING APPARATUS, AND COMPUTER READABLE MEDIUM HAVING MANAGEMENT APPARATUS WITH DISTRIBUTED STORAGE

(75) Inventors: Tadahiko Ikegaya, Tokyo (JP); Makoto Nishimura, Tokyo (JP); Masahiro Oishi, Tokyo (JP); Kazuaki Ozawa, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 81 days.

(21) Appl. No.: 13/299,947

(22) Filed: Nov. 18, 2011

(65) Prior Publication Data
US 2012/0307309 A1    Dec. 6, 2012

(30) Foreign Application Priority Data
Jun. 3, 2011   (JP) ................. 2011-125368

(51) Int. Cl.
*G06F 3/12* (2006.01)
*G06F 21/60* (2013.01)
*G06K 15/00* (2006.01)

(52) U.S. Cl.
CPC .............. *G06F 3/1222* (2013.01); *G06F 3/129* (2013.01); *G06F 3/1291* (2013.01); *G06F 21/608* (2013.01); *G06F 3/1238* (2013.01); *G06F 3/1267* (2013.01)
USPC ........................................ 358/1.15; 358/1.16

(58) Field of Classification Search
CPC ... G06F 3/1222; G06F 3/1238; G06F 3/1291; G06F 3/1267; G06F 3/129; G06F 21/608
USPC .............................. 358/1.15, 1.14, 1.13, 1.16
See application file for complete search history.

(56) References Cited

U.S. PATENT DOCUMENTS

| 7,889,369 B2* | 2/2011 | Yoshida et al. ............... 358/1.15 |
| 8,081,336 B2* | 12/2011 | Yoshida et al. ............... 358/1.15 |
| 8,330,980 B2* | 12/2012 | Sorrentino et al. .......... 358/1.15 |
| 8,339,639 B2* | 12/2012 | St. Jacques et al. ......... 358/1.15 |
| 2005/0088684 A1* | 4/2005 | Naito et al. ................... 358/1.15 |
| 2006/0061819 A1* | 3/2006 | Fujiwara et al. ............. 358/1.15 |
| 2006/0146372 A1* | 7/2006 | Bair et al. ..................... 358/403 |

(Continued)

FOREIGN PATENT DOCUMENTS

EP    2 017 718 A2    1/2009
JP    A-2008-242851    10/2008

OTHER PUBLICATIONS

Office Action dated Jan. 22, 2013 issued in Australian Patent Application No. 2011256892.

*Primary Examiner* — Houshang Safaipour
*Assistant Examiner* — Walter Yehl
(74) *Attorney, Agent, or Firm* — Oliff PLC

(57) ABSTRACT

An image forming system includes a first storage unit that stores identification information and storage information with the identification information mapped to the storage information, the identification information identifying a user, the storage information indicating a storage location where image data corresponding to the identification information is stored, an identifying unit that, in response to the identification information input by the user, identifies the storage location indicated by the storage information stored on the first storage unit with the identification information mapped thereto, a retrieval unit that retrieves, from the storage location identified by the identifying unit, the image data corresponding to the identification information, and an image forming unit that forms an image responsive to the image data retrieved by the retrieval unit.

6 Claims, 7 Drawing Sheets

(56) References Cited

U.S. PATENT DOCUMENTS

| | | |
|---|---|---|
| 2007/0013945 A1 | 1/2007 | Yoshida et al. |
| 2007/0273923 A1* | 11/2007 | Kimura ........................ 358/1.15 |
| 2008/0062454 A1 | 3/2008 | Bostick et al. |
| 2008/0244756 A1 | 10/2008 | Kitada |
| 2009/0021768 A1* | 1/2009 | Purpura et al. ............... 358/1.15 |
| 2010/0141983 A1 | 6/2010 | Sorrentino et al. |
| 2010/0149572 A1 | 6/2010 | St. Jacques, Jr. et al. |
| 2011/0026075 A1* | 2/2011 | Maruyama et al. .......... 358/1.15 |
| 2011/0102843 A1 | 5/2011 | Yoshida et al. |
| 2012/0327457 A1* | 12/2012 | Hoshina et al. .............. 358/1.15 |
| 2013/0088754 A1* | 4/2013 | Ichimura et al. ............. 358/1.16 |
| 2013/0094051 A1* | 4/2013 | Yamada et al. .............. 358/1.15 |

\* cited by examiner

| USER ID | PASSWORD | SPOOLER INFORMATION | |
| --- | --- | --- | --- |
| | | PRIMARY | SECONDARY |
| user001 | 1234 | spoolerA | spoolerC |
| user002 | 5678 | spoolerB | spoolerC |
| ... | ... | ... | ... |

IMAGE FORMING SYSTEM, INFORMATION FORMING APPARATUS, AND COMPUTER READABLE MEDIUM HAVING MANAGEMENT APPARATUS WITH DISTRIBUTED STORAGE

CROSS-REFERENCE TO RELATED APPLICATIONS

This application is based on and claims priority under 35 USC 119 from Japanese Patent Application No. 2011-125368 filed Jun. 3, 2011.

BACKGROUND (i) Technical Field

The present invention relates to an image forming system, an image forming apparatus, and a computer readable medium storing a program causing a computer to execute a process for forming an image.

(ii) Related Art

According to one related art technique, a print server apparatus stores image data specified by a user, and then allows multiple image forming apparatuses to access the image data.

SUMMARY

According to an aspect of the invention, there is provided an image forming system. The image forming system includes a first storage unit that stores identification information and storage information with the identification information mapped to the storage information, the identification information identifying a user, the storage information indicating a storage location where image data corresponding to the identification information is stored, an identifying unit that, in response to the identification information input by the user, identifies the storage location indicated by the storage information stored on the first storage unit with the identification information mapped thereto, a retrieval unit that retrieves, from the storage location identified by the identifying unit, the image data corresponding to the identification information, and an image forming unit that forms an image responsive to the image data retrieved by the retrieval unit.

BRIEF DESCRIPTION OF THE DRAWINGS

Exemplary embodiments of the present invention will be described in detail based on the following figures, wherein.

DETAILED DESCRIPTION

Figure 1:
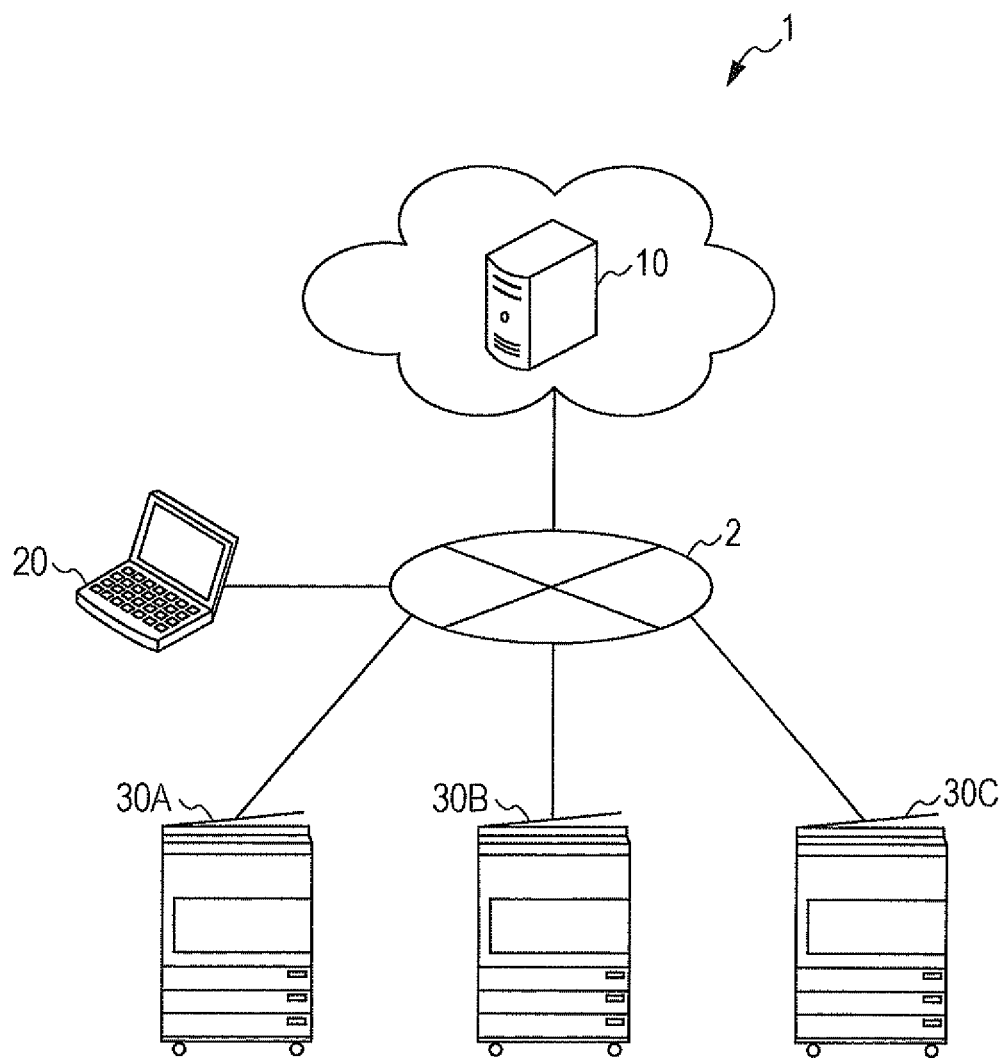
FIG. 1 diagrammatically illustrates a configuration of an image forming system.

FIG. 1 diagrammatically illustrates an image forming system 1 of an exemplary embodiment. The image forming system 1 includes authentication server apparatus 10 (one example of a management apparatus), client apparatus 20 (an example of a transmitter), and image forming apparatuses 30A, 30B, and 30C. Each of the image forming apparatuses 30A, 30B, and 30C is referred to as an image forming apparatus 30 without the suffix A, B, or C if it is not necessary to discriminate one from another among the image forming apparatuses 30A, 30B, and 30C. The authentication server apparatus 10 authenticate a user. The client apparatus 20 transmits the print data to the image forming apparatus 30. The image forming apparatus 30 is an electrophotographic printer. The authentication server apparatus 10 provides service using cloud computing. The authentication server apparatus 10 is operated by a third party different from users of the client apparatus 20 and the image forming apparatus 30. With a permit granted by the third party, the users of the client apparatus 20 and the image forming apparatus 30 may use the authentication server apparatus 10.

Figures 2, 3:
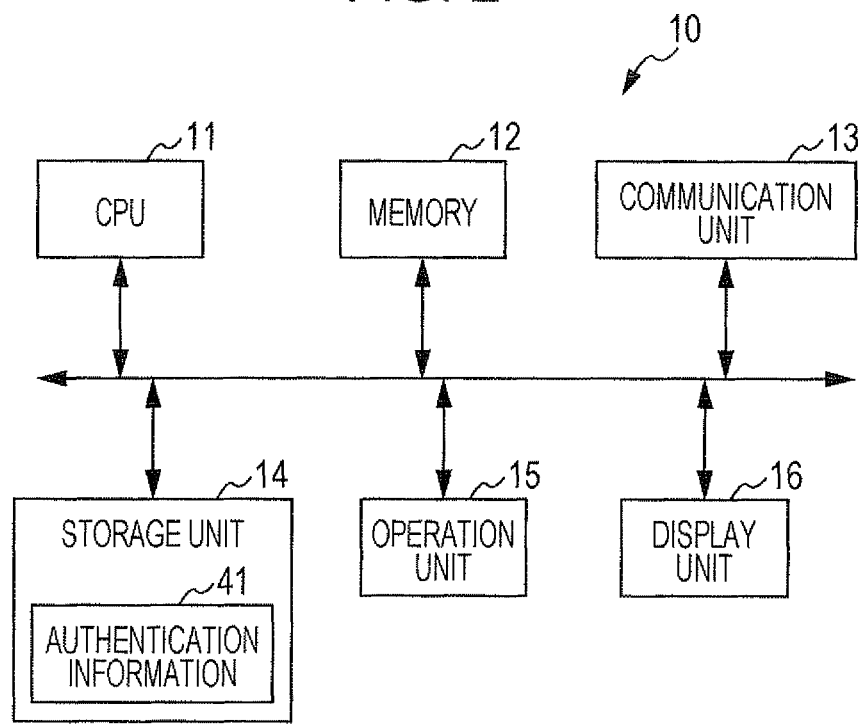
FIG. 2 illustrates a hardware configuration of an authentication server apparatus.
FIG. 3 illustrates an example of authentication information.

FIG. 2 illustrates a hardware configuration of the authentication server apparatus 10. The authentication server apparatus 10 includes central processing unit (CPU) 11, memory 12, communication unit 13, storage unit 14 (an example of a first storage unit), operation unit 15, and display unit 16. The CPU 11 executes a program stored on the memory 12, thereby controlling each of the elements of the authentication server apparatus 10. The communication unit 13 is a communication interface connected to a communication line 2. The CPU 11 communicates with the image forming apparatus 30 via the communication unit 13. The storage unit 14 may be a hard disk. The storage unit 14 stores authentication information 41. The operation unit 15 includes a keyboard and a mouse, for example. The operation unit 15 is used to operate the authentication server apparatus 10. The display unit 16 is a display device such as a liquid-crystal display device.

FIG. 3 illustrates an example of the authentication information 41. The authentication information 41 includes a user ID, a password, and spooler information. The user ID, the password, and the spooler information are stored in a mutually related. The user ID is identification information identifying the user. The password is used to identify the user. The password is set up by the user. The spooler information is storage information indicative of a storage location where image data instructed to process by the user (hereinafter referred to as "image data of the user") is stored. The spooler information may be an Internet protocol (IP) address or identification information assigned to a storage location. The spooler information includes primary spooler information and secondary spooler information. The primary spooler information is storage information indicative of a storage location having the highest priority. The second spooler information is storage information indicative of a storage location having the second highest priority. In the authentication information 41 of FIG. 3, spooler information "spoolerA" indicates a storage location of the image forming apparatus 30A, spooler information "spoolerB" indicates a storage location of the image forming apparatus 30B, and spooler information "spoolerC" indicates a storage location of the image forming apparatus 30C.

Figure 4:
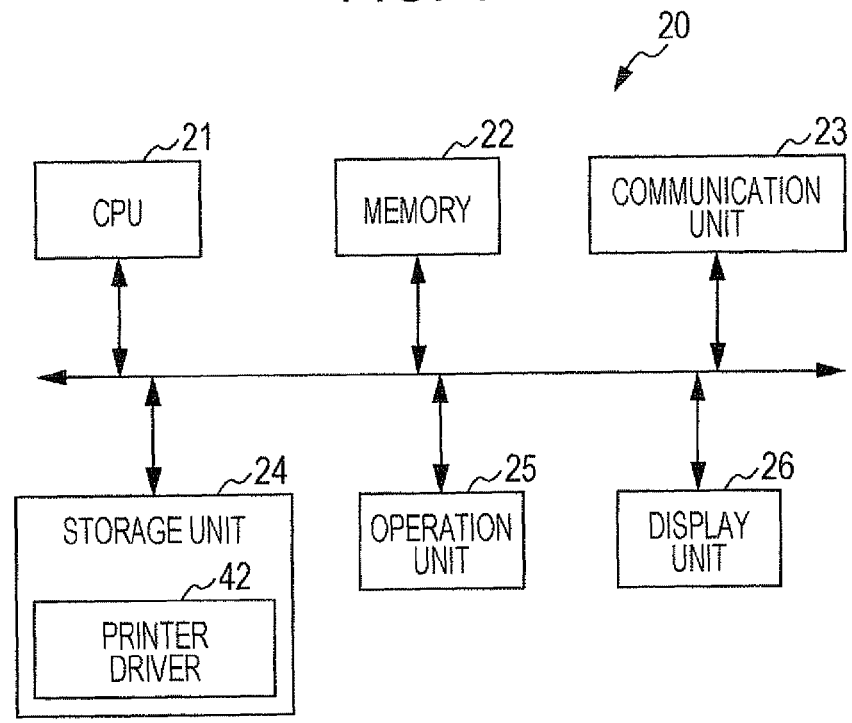
FIG. 4 illustrates a hardware configuration of a client apparatus.

FIG. 4 illustrates a hardware configuration of the client apparatus 20. The client apparatus 20 includes CPU 21, memory 22, communication unit 23, storage unit 24, operation unit 25, and display unit 26. The CPU 21 executes a program stored on the memory 22, thereby controlling each of the elements of the client apparatus 20. The communication unit 23 is a communication interface connected to the communication line 2. The CPU 21 communicates with the image forming apparatus 30 via the communication unit 23. The storage unit 24 may be a hard disk. The storage unit 24 stores a printer driver 42. The printer driver 42 is a program generating image data which is processed on the image forming apparatus 30. The operation unit 25 includes a keyboard and a mouse, for example. The operation unit 25 is used to operate the client apparatus 20. The display unit 26 displays an image responsive to image data.

The user ID of the user and the spooler information are set beforehand in the printer driver 42. More specifically, user ID "user001," primary spooler information "spoolerA," and secondary spooler information "spoolerB" are set in the printer driver 42. As illustrated in FIG. 3, the user ID and the spooler information set in the printer driver 42 are registered in the authentication information 41.

Figure 5:
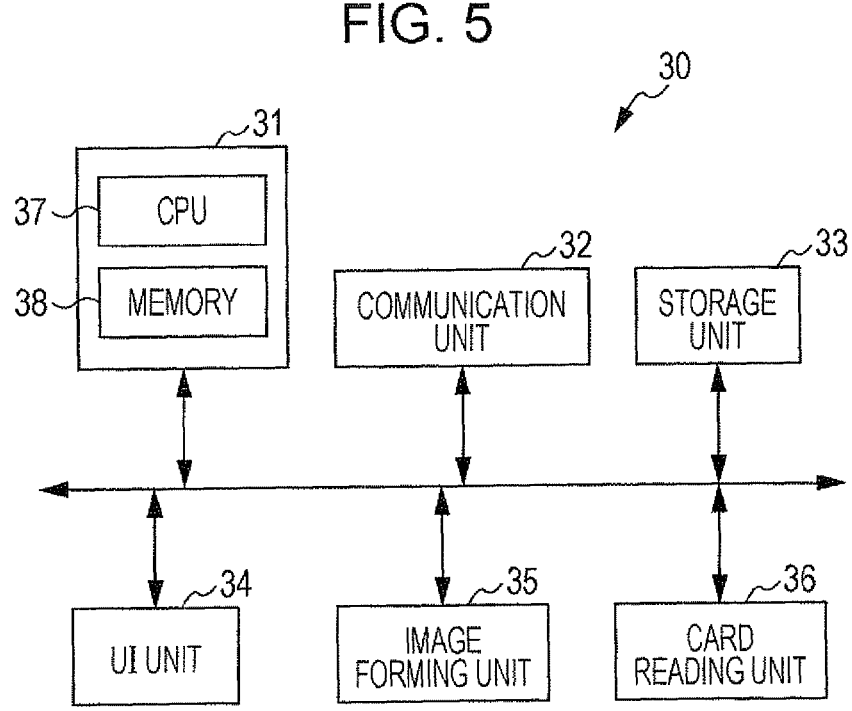
FIG. 5 illustrates a hardware configuration of an image forming apparatus.

FIG. 5 illustrates a hardware configuration of the image forming apparatus 30. The image forming apparatus 30 includes controller 31, communication unit 32, storage unit 33, user interface (UI) unit 34, image forming unit 35, and card reading unit 36. The controller 31 includes CPU 37, and memory 38 (an example of a second storage unit). The CPU 37 executes a program stored on the memory 38, thereby controlling each of the elements of the image forming apparatus 30. The communication unit 32 is a communication interface connected to the communication line 2. The controller 31 communicates with one of the authentication server apparatus 10, the client apparatus 20, and another image forming apparatus 30 via the communication unit 32. The storage unit 33 may be a hard disk. The storage unit 33 stores the print data transmitted from the client apparatus 20. The UI unit 34 may include a touch screen and keys. The UI unit 34 is used to operate the image forming apparatus 30. The image forming unit 35 forms on paper an image correspond to the image data. The card reading unit 36 reads information, stored on an integrated circuit (IC) card, in a contactless fashion. The IC card is beforehand supplied to the user to authenticate the user. The IC card stores the user ID "user001" and password "1234" of the user included in the authentication information 41.

Figure 6:
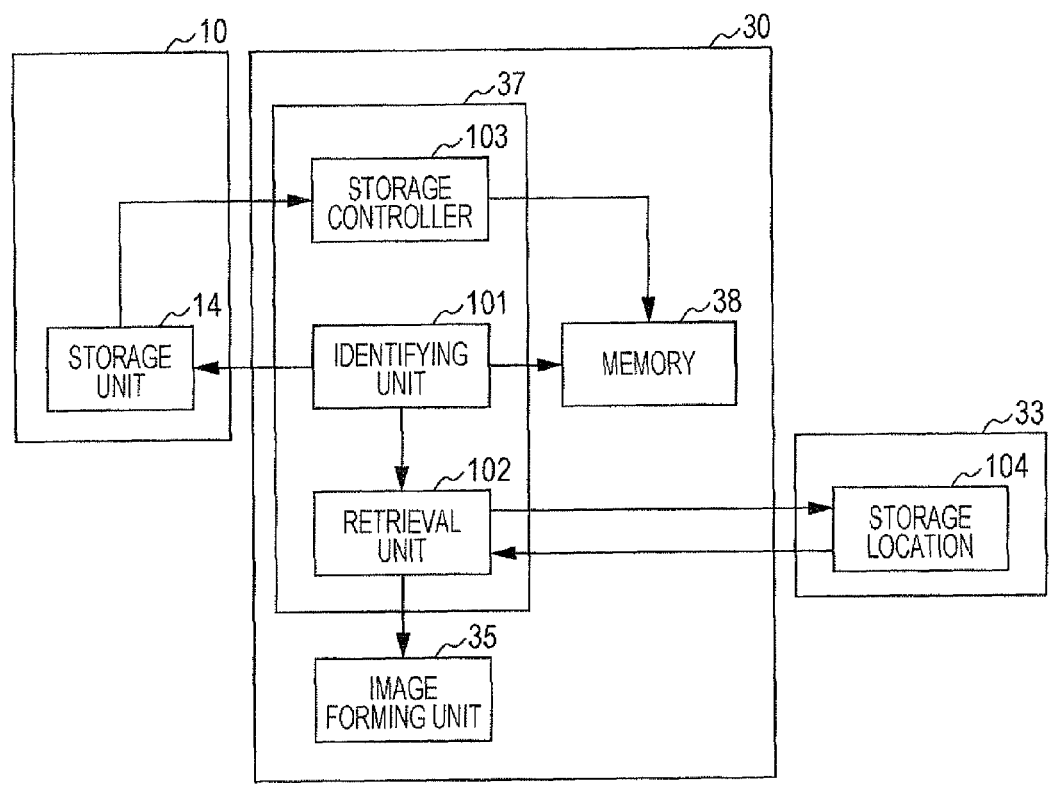
FIG. 6 is a functional block diagram of the image forming system.

FIG. 6 is a functional block diagram of the image forming system 1. Identifying unit 101, retrieval unit 102, and storage controller 103 are implemented when the CPU 37 executes the program. A storage location 104 is arranged in the storage unit 33 of the image forming apparatus 30. If the user enters the user ID, the identifying unit 101 identifies the storage location 104 indicated by the spooler information related to the user ID in the authentication information 41 stored on the storage unit 14. The retrieval unit 102 retrieves the image data correspond to the input user ID from the storage location 104 identified by the identifying unit 101. The image forming unit 35 forms an image responsive to the image data retrieved by the retrieval unit 102. The storage controller 103 retrieves the authentication information 41 from the storage unit 14, and causes the memory 38 to store the retrieved authentication information 41. If the authentication information 41 is stored on the memory 38, the identifying unit 101 identifies the storage location 104 using the authentication information 41 on the memory 38.

Figure 7:
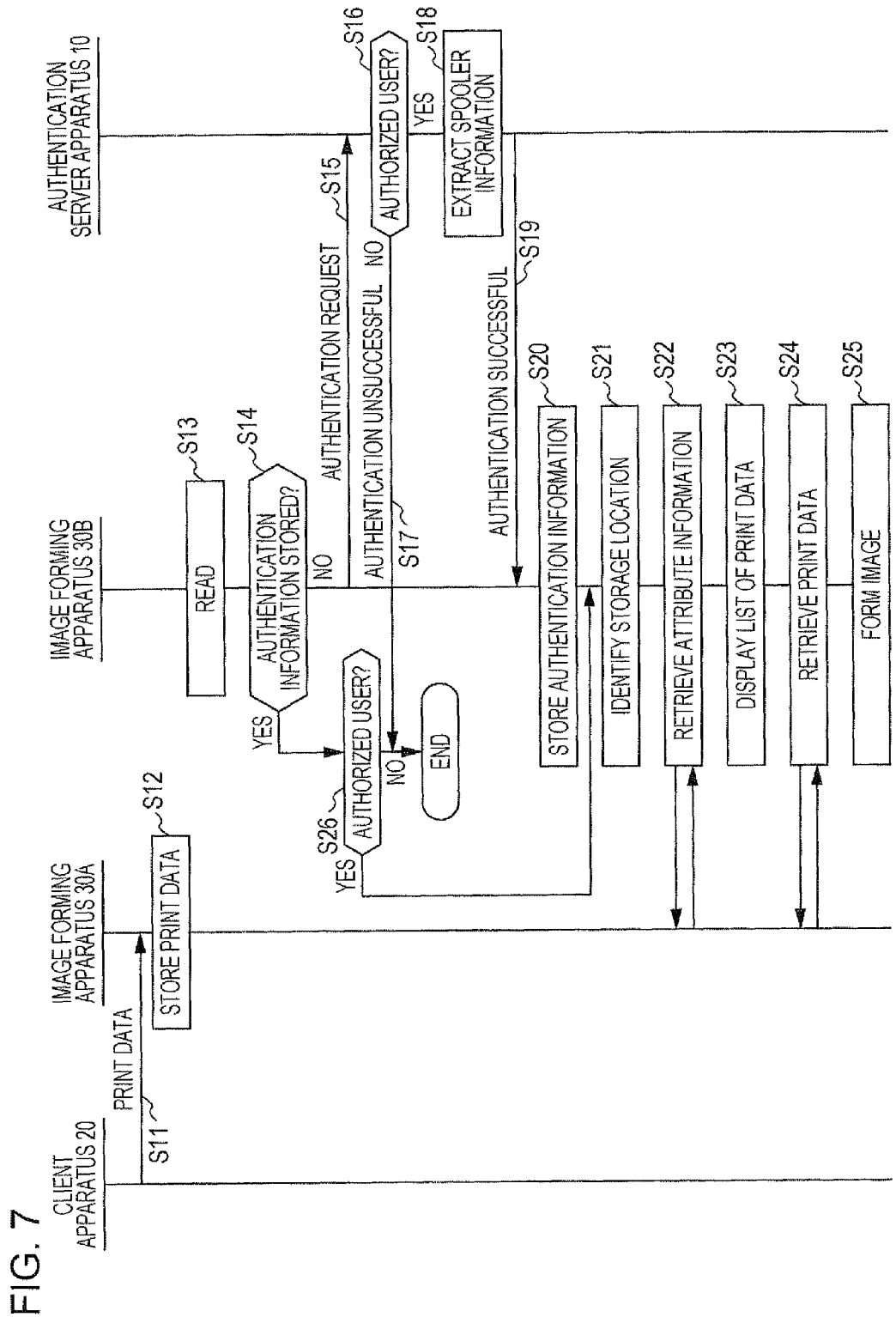
FIG. 7 is a sequence chart illustrating an operation of the image forming system.

FIG. 7 is a sequence chart of an operation of the image forming system 1. The user specifies the image data using the operation unit 25 of the client apparatus 20, and issues an image forming instruction of the image data. The CPU 21 executes the printer driver 42, thereby generating the print data including the image data specified by the user. In the exemplary embodiment, the user may specify image data D1. The print data includes the image data D1. The CPU 21 attaches attribute information to the print data. The attribute information includes the user ID set in the printer driver 42 and a file name of the image data. As described above, the user ID "user001" of the user is set in the printer driver 42. The attribute information thus includes the user ID "user001" and the file name of the image data D1.

Upon generating the print data, the CPU 21 identifies the storage location of the generated print data in accordance with the spooler information set beforehand in the printer driver 42. After identifying the storage location of the print data, the CPU 21 transmits the generated print data to the identified storage location via the communication unit 23 (step S11). As described above, the primary spooler information "spoolerA" and the secondary spooler information "spoolerB" are set in the printer driver 42. The CPU 21 transmits a test message to the image forming apparatus 30A indicated by the primary spooler information "spoolerA." If the image forming apparatus 30A replies, the CPU 21 determines that communication establishment with the image forming apparatus 30A has been successful. The CPU 21 transmits the print data to the image forming apparatus 30A. If no reply is received from the image forming apparatus 30A within a predetermined period of time, the CPU 21 determines that normal communication with the image forming apparatus 30A is disable. No reply may be received from the image forming apparatus 30A if a fault occurs in the image forming apparatus 30A or if a fault occurs in the communication line 2 between the client apparatus 20 and the image forming apparatus 30A. In such a case, the CPU 21 transmits a test message to the image forming apparatus 30C indicated by the secondary spooler information "spoolerC." If a reply is received from the image forming apparatus 30C within a predetermined period of time, the CPU 21 transmits the print data to the image forming apparatus 30C. More specifically, the CPU 21 transmits the print data to a storage location being enabled and having the highest priority from among multiple storage locations set in the printer driver 42. The word "enabled" means that the print data can be stored at the storage location. The fact that the normal communication is established with the authentication server apparatus 10 is interpreted to mean that the authentication server apparatus 10 is enabled. It is assumed that the print data has been transmitted to the image forming apparatus 30A.

If the client apparatus 20 transmits the print data, a controller 31A of the image forming apparatus 30A causes a storage unit 33A to store the print data (step S12). As described above, the print data transmitted from the client apparatus 20 includes the image data D1. The attribute information, including the user ID "user001" and the file name of the image data D1, is attached to the print data. The storage unit 33A stores the attribute information together with the print data including the image data D1.

After instructing the client apparatus 20 to form an image on the image forming apparatus 30, the user moves to a place where one of the image forming apparatuses 30A, 30B, and 30C is installed. For example, the user may move to the place where the image forming apparatus 30 is installed. If the image forming apparatus 30 usually used by the user is currently used by another user, the user may move to another image forming apparatus 30 nearby. The user may move to an image forming apparatus 30 closest to them. In other words, the user moves to a place to use one of the image forming apparatuses 30A, 30B, and 30C. The user may now move to the image forming apparatus 30B.

The UI unit 34 in the image forming apparatus 30 presents an authentication screen. The image forming apparatus 30 receives no input from the user if the user is not authenticated. The user moves to the image forming apparatus 30B and swipes their IC card over the card reading unit 36B for authentication. If the IC card is positioned close to the card reading unit 36B, the card reading unit 36B reads the user ID and the password stored on the IC card (step S13). Upon reading these pieces of information from the IC card, the card reading unit 36B inputs the read information to the controller 31B. As described above, the IC card stores the user ID "user001" and the password "1234." The user ID "user001" and the password "1234" are input to the controller 31B.

If the user ID and the password are input, the controller 31B determines whether the authentication information 41 is stored on the memory 38B (step S14). If the memory 38B stores the authentication information 41, the memory 38 also stores information indicating that the authentication information 41 is stored. Depending on whether the information is stored on the memory 38, the controller 31B determines whether the authentication information 41 is stored or not. If the image forming apparatus 30B has placed no authentication request on the authentication server apparatus 10 at all, the authentication information 41 is not stored on the memory 38B (no loop from step S14). In such a case, the communication unit 32B in the controller 31B transmits the input user ID and password to the authentication server apparatus 10, thereby requesting the user to be authenticated (step S15).

The user ID and the password are transmitted from the image forming apparatus 30B in this way. The CPU 11 in the authentication server apparatus 10 receives the user ID and the password via the communication unit 13. Upon receiving the user ID and the password, the CPU 11 checks the received user ID and password against the user ID and password included in the authentication information 41 stored on the storage unit 14. The CPU 11 thus determines whether the user of the image forming apparatus 30B is an authorized user (step S16). If the received user ID and password received from the image forming apparatus 30B are not included in the authentication information 41, the CPU 11 determines that the user of the image forming apparatus 30B is not an authorized user (no loop from step S16). The CPU 11 transmits information, indicating that authentication is unsuccessful, to the image forming apparatus 30B via the communication unit 13 (step S17). However, in this case, the user ID "user001" and the password "1234" are transmitted from the image forming apparatus 30B. The authentication information 41 of FIG. 3 includes the user ID "user001" and the password "1234." The CPU 11 thus determines that the user of the image forming apparatus 302 is an authorized user (yes loop from step S16).

If the user of the image forming apparatus 30B is an authorized user, the CPU 11 extracts from the authentication information 41 stored on the storage unit 14 the spooler information corresponding to the user ID received from the image forming apparatus 30B (step S18). In the authentication information 41 of FIG. 3, the user ID "user001" is related to the primary spooler information "spoolerA" and the secondary spooler information "spoolerC." The CPU 11 thus extracts from the authentication information 41 the primary spooler information "spoolerA" and the secondary spooler information "spoolerC." Upon retrieving the spooler information, the CPU 11 transmits to the image forming apparatus 30B via the communication unit 13 information indicating that authentication is successful, the extracted spooler information, and the authentication information 41 stored on the storage unit 14 (step S19).

The information indicating that authentication is successful, the extracted spooler information, and the authentication information 41 are transmitted from the authentication server apparatus 10. The controller 31B receives these pieces of information via the communication unit 32B, and causes the memory 38B to store the received authentication information 41 (step S20). The controller 31B causes the memory 38B to store information indicating that the authentication information 41 has been stored. Tri response to the spooler information received from the authentication server apparatus 10, the controller 31B identifies the storage location storing the print data of the user (step S21). The primary spooler information "spoolerA" and the secondary spooler information "spoolerC" are transmitted as the spooler information from the authentication server apparatus 10. The controller 31B identifies as the highest priority storage location the storage location of the image forming apparatus 30A indicated by the primary spooler information "spoolerA." The controller 31B identifies as the second highest priority storage location the storage location of the image forming apparatus 30C indicated by the primary spooler information "spoolerC."

Upon identifying the storage location, the controller 31B accesses the storage location and then retrieves the attribute information of the print data of the user (step S22). In step S21, the controller 318 identifies the storage location of the image forming apparatus 30A as the storage location having the highest priority, and the storage location of the image forming apparatus 30C as the storage location having the second highest priority. The controller 318 notifies the image forming apparatus 30A of the user ID "user001" via the communication unit 32B, and places a request for the attribute information including the user ID on the image forming apparatus 30A. In response to the request, the controller 31A reads from the storage unit 33A all the attribute information including the user ID "user001" received from the image forming apparatus 30B, and then transmits the attribute information including the user ID "user001" to the image forming apparatus 30B via the communication unit 32A. If the attribute information including the user ID "user001" is not stored on the storage unit 33A, no attribute information is transmitted from the image forming apparatus 30A. In this case, the controller 31B notifies the image forming apparatus 30C identified as the storage location having the second highest priority of the user ID "user001" via the communication unit 32B. The controller 31B then places a request for the attribute information including the user ID on the image forming apparatus 30C. In step S12, the attribute information including the user ID "user001" and the file name of the image data D1 is stored on the storage unit 33A. The attribute information is thus transmitted from the image forming apparatus 30A to the image forming apparatus 30B. The controller 31B receives the attribute information via the communication unit 32B.

Figure 8:
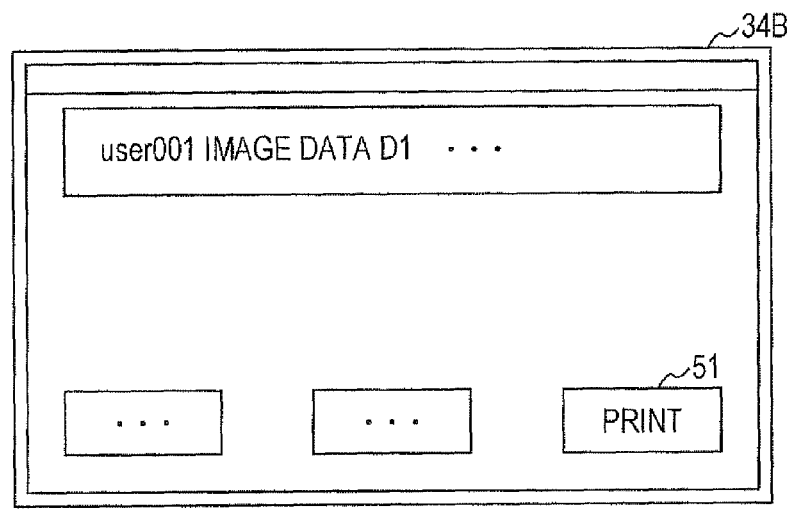
FIG. 8 illustrates an example of listing of print data of an exemplary embodiment.

Upon receiving the attribute information of the print data, the controller 31B causes the UI unit 34B to display a list of print data in response to the attribute information (step S23). FIG. 8 illustrates an example of the list of print data displayed on the UI unit 34B. The list of print data includes the attribute information retrieved in step S22. The list of print data of FIG. 8 includes the user ID "user001" and the file name of the image data D1 included in the attribute information retrieved from the image forming apparatus 30A. Using the UI unit 34B, the user selects print data from the list of print data, and presses a "PRINT" button 51. If the "PRINT" button 51 is pressed, the controller 31B retrieves the print data from the image forming apparatus 30 that stores the selected print data (step S24). In the list of print data of FIG. 8, an area displaying the user ID "user001" and the file name of the image data D1 may be selected, and the "PRINT" button 51 may be pressed. The controller 318 requests, via the communication unit 32B, the image forming apparatus 30A to send the print data with the attribute information including the user ID and the file name attached to the print data. In response to the request, the controller 31A reads the requested print data from the storage unit 33A, and transmits the read print data to the image forming apparatus 30B via the communication unit 32A. If the print data is transmitted from the image forming apparatus 30A, the controller 31B receives the print data via the communication unit 32B. Upon receiving the print data, the controller 31B extracts the image data D1 from the print data, and causes the image forming unit 358 to form an image responsive to the image data D1 (step S25). The image forming unit 35B outputs the image by forming the image responsive to the image data D1 on a paper sheet.

When the image forming apparatus 30B is used again next time after the authentication information 41 is stored on the memory 38 in step S20, the user is authenticated using the authentication information 41 stored on the memory 38B. The controller 31B determines in step S14 that the authentication information 41 is stored on the memory 38B (yes loop from step S14), and proceeds to step S26. The controller 31B checks the user ID and password input from the card reading unit 36B against the user ID and password included in the authentication information 41 stored on the memory 38B, and thus determines whether the user of the image forming apparatus 30B is an authorized user (step S26). If the input user ID and password are included in the authentication information 41, the controller 31B determines that the user of the image forming apparatus 30B is an authorized user (yes loop from step S26). The controller 31B thus proceeds to step S21.

If the controller 31B determines that the user of the image forming apparatus 30B is not an authorized user (no loop from step S26), the controller 31B displays on the UI unit 34B a message indicating that authentication is unsuccessful, and then ends the process. If information indicating that authentication is unsuccessful is transmitted from the authentication server apparatus 10 in step S17, the controller 31B also displays on the UI unit 34B the message indicating that authentication is unsuccessful, and then ends the process.

In the exemplary embodiment, the image data is retrieved from a storage location different from user to user in order to form the image. In the exemplary embodiment, the storage location of the print data is arranged in the image forming apparatus 30, and no print server is employed. In comparison with the case where a print server is installed, and the storage location is arranged in the print server, costs involved in the construction of the image forming system 1 are low, and the workload on a supervisor managing the image forming system 1 is low. In the exemplary embodiment, only the authentication information 41 is stored on the authentication server apparatus 10, and the print data is not stored on the authentication server apparatus 10. The print data may include personal information and confidential information. If the print data is stored on the authentication server apparatus 10 that is managed by the third party, information security level may be possibly lowered. In the exemplary embodiment, the print data is stored on the image forming apparatus 30. Cloud computing may be implemented by constructing a mechanism where the print data is stored on one image forming apparatus 30 and an image responsive to the print data is formed on another image forming apparatus 30. A high information security level is still maintained even in such cloud computing.

The present invention is not limited to the exemplary embodiment. The exemplary embodiment may be modified as described below. Modifications described below may be combined.

First Modification

In the exemplary embodiment, the print data is stored on one of the storage location indicated by the primary spooler information and the storage location indicated by the secondary spooler information. Alternatively, the print data of the user may be stored on both the storage locations. The client apparatus 20 may transmit the print data to both the storage locations. If the storage location of the image forming apparatus 30A has the highest priority with the storage location of the image forming apparatus 30C having the second highest priority, the client apparatus 20 transmits the print data not only to the image forming apparatus 30A but also to the image forming apparatus 30C. With the print data also transmitted to the image forming apparatus 30C, the print data may be retrieved from the image forming apparatus 30C if the print data is difficult to retrieve from the image forming apparatus 30A. Such difficulty may arise if the image forming apparatus 30A remains powered off, for example.

The image forming apparatus 30 having received the print data from the client apparatus 20 may make a copy of the print data, and may transmit the copy to another storage location. If the image forming apparatus 30A (an example of a storage device) receives the print data from the client apparatus 20, the controller 31A extracts the user ID from the received print data. The controller 31A then retrieves the spooler information corresponding to the extracted user ID from one of the client apparatus 20 and the authentication server apparatus 10. To retrieve the spooler information from the client apparatus 20, the controller 31A retrieves the spooler information set in the printer driver 42. To retrieve the spooler information from the authentication server apparatus 10, the controller 31A retrieves the spooler information corresponding to the extracted user ID from the authentication information 41 stored on the storage unit 14.

Upon retrieving the spooler information, the controller 31A (an example of a transmitter) makes a copy of the received print data. The controller 31A transmits the copy of the print data to the storage location other than the storage unit 33A from among the storage locations indicated by the retrieved spooler information. If the primary spooler information "spoolerA" and the secondary spooler information "spoolerC" are retrieved from one of the client apparatus 20 and the authentication server apparatus 10, the controller 31A transmits the copy of the print data to the image forming apparatus 30C indicated by the secondary spooler information "spoolerC." With the copy of the print data transmitted to the image forming apparatus 30C, the print data may be retrieved from the image forming apparatus 30C if the print data of the user is difficult to retrieve from the image forming apparatus 30A. Such difficulty may arise if the image forming apparatus 30A remains powered off, for example.

If the image forming apparatus 30B retrieves the print data in step S24, the controller 31A may transmit, to the image forming apparatus 30C, information instructing the image forming apparatus 30C to delete the print data. In response to the information, the controller 31C deletes the print data.

Second Modification

The authentication information 41 stored on the authentication server apparatus 10 may be modified. The authentication information 41 stored on the memory 38 may be periodically updated in order to make the authentication information 41 stored on the memory 38 consistent with the authentication information 41 stored on the authentication server apparatus 10. At the update timing of the authentication information 41, the controller 31 accesses the authentication server apparatus 10. The image forming apparatus 30 retrieves the newest authentication information 41 from the authentication server apparatus 10, and stores the newest authentication information 41 on the memory 38.

The image forming apparatus 30 causes the UI unit 34 to display a button instructing the authentication information 41 to be updated. When the user presses this button, the authentication information 41 stored on the memory 38 may be updated.

Third Modification

To raise the security level, the authentication information 41 may be deleted from the memory 38 at a predetermined timing, for example, once a month. If the authentication information 41 is deleted from the memory 38, the controller 31 proceeds to step S15 when the image forming apparatus 30 is used next time. The controller 31 then requests the authentication server apparatus 10 to authenticate the user. The controller 31 retrieves the newest authentication information 41 from the authentication server apparatus 10 in step S19.

The image forming apparatus 30 causes the UI unit 34 to display a button instructing the authentication information 41 to be deleted. When the user presses this button, the authentication information 41 is deleted from the memory 38.

Fourth Modification

It may be acceptable that the image forming apparatus 30 does not cause the memory 38 to store the authentication information 41. If the authentication information 41 is not stored on the memory 38, the controller 31 places an authentication request to the authentication server apparatus 10 each time. The controller 31 does not perform steps S20 and S26, and step S14 is not necessary.

Whether to store the authentication information 41 on the memory 38 may be set in the image forming apparatus 30. For example, the authentication information 41 may be stored on the memory 38 in the image forming apparatuses 30A and 30B, but the authentication information 41 is not stored on the memory 38 in the image forming apparatus 30C.

Fifth Modification

Optionally, the authentication information 41 of a particular user may not be stored on the memory 38 in the image forming apparatus 30. For example, if a privilege level of a user is lower than a threshold value, the image forming apparatus 30 does not cause the memory 38 to store the authentication information 41 of that user. The privilege level is information related to the privilege of using the image forming apparatus 30. The privilege level of the user, in addition to the user ID and the spooler information, is stored on the IC card. Upon receiving the user ID, the spooler information, and the privilege information from the card reading unit 36, the controller 31 determines whether the input privilege level is equal to or higher than the threshold value. If the input privilege level is equal to or higher than the threshold value, the controller 31 proceeds to step S14. If the input privilege level is lower than the threshold value, the controller 31 proceeds to step S15 without performing step S14. Upon receiving the authentication information 41 from the authentication server apparatus 10 in step S20, the controller 31 deletes the input user ID and password from the authentication information 41. For example, if a user is a company short-term employee such as a part-time worker, the privilege level of the employee may be set to be lower, and the authentication information 41 of the employee may not be stored on the memory 38.

Sixth Modification

The storage location of the print data is not limited to the storage unit 33 of the image forming apparatus 30. If the image forming system 1 includes a storage server apparatus, the print data may be stored on that storage server apparatus. The print data may be stored on the client apparatus 20. If the image forming system 1 includes a plurality of client apparatuses 20, the print data may be stored on a client apparatus 20 different from the client apparatus 20 to which the print data has been transmitted.

Seventh Modification

Figure 9:
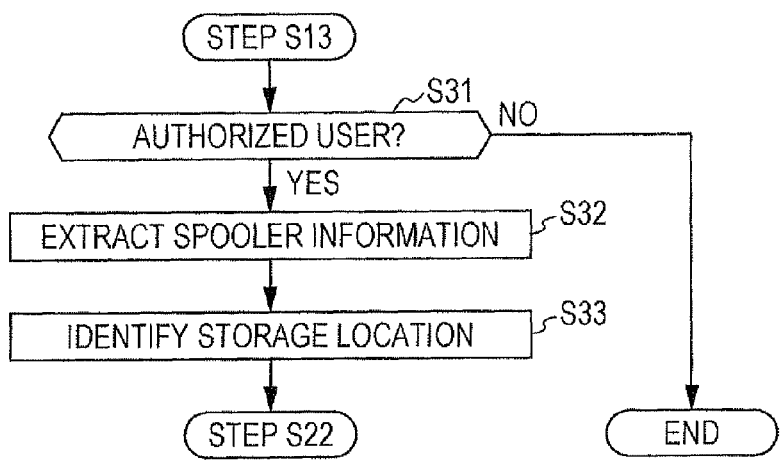
FIG. 9 is a flowchart of an operation of a modification of the image forming apparatus.

If the authentication information 41 is not stored on the memory 38 in the exemplary embodiment, the authentication server apparatus 10 authenticates the user. Alternatively, the image forming apparatus 30 may authenticate the user without using the authentication server apparatus 10. In such a case, the authentication server apparatus 10 becomes unnecessary. The authentication information 41 is beforehand stored on the storage unit 33. FIG. 9 is a flowchart of the operation of the image forming apparatus 30 of the modification. Subsequent to step S13, the controller 31 proceeds to step S31. Using the authentication information 41 stored on the storage unit 33, the controller 31 determines as in the above-described step S26 whether the user of the image forming apparatus 30 is an authorized user (step S31). If the user of the image forming apparatus 30 is not an authorized user (no loop from step S31), the controller 31 ends the process. If the user of the image forming apparatus 30 is an authorized user (yes loop from step S31), the controller 31 extracts the spooler information corresponding to the input user ID from the authentication information 41 stored on the storage unit 33 (step S32). With the spooler information extracted, the controller 31 identifies the storage location storing the image data of the user in the same manner as in the above-described step S21 in response to the extracted spooler information (step S33). Subsequent to step S33, the controller 31 proceeds to step S22.

Eighth Modification

The spooler information of the user may be stored on the IC card. If the spooler information is stored on the IC card, the spooler information may not be included in the authentication information 41. In step S13, the card reading unit 36 reads the user ID, the password, and the spooler information from the IC card, and then inputs these pieces of information to the controller 31. In step S21, the controller 31 identifies the storage location of the image data of the user in response to the spooler information input from the card reading unit 36.

If the spooler information of the user is stored on the IC card, the client apparatus 20 may retrieve the spooler information from the IC card. In this case, the card reading unit 36 is also arranged on the client apparatus 20. The client apparatus 20 retrieves the spooler information stored on the IC card using the card reading unit 36. With the spooler information retrieved, the client apparatus 20 transmits the print data to the storage location indicated by the spooler information. The setting of the spooler information in the printer driver 42 becomes unnecessary.

Ninth Modification

Each user may register the authentication information 41 using the client apparatus 20. If at least part of the authentication information 41 is stored an upper system, the authentication server apparatus 10 may read the part of the authentication information 41 from the upper system.

Tenth Modification

In the exemplary embodiment, the print data corresponding to the user ID "user001" is stored only on the image forming apparatus 30A. First print data corresponding to the user ID "user001" may be stored on the storage unit 33A of the image forming apparatus 30A, and second print data corresponding to the user ID "user001" may be stored on the storage unit 33C of the image forming apparatus 30C. In such a case, in step S22, the controller 31B retrieves the attribute information attached to the first print data from the image forming apparatus 30A, and the attribute information attached to the second print data from the image forming apparatus 30C. In step S23, the controller 31B displays a list of print data responsive to the attribute information of the first print data and the attribute information of the second print data retrieved in step S22.

Figure 10:
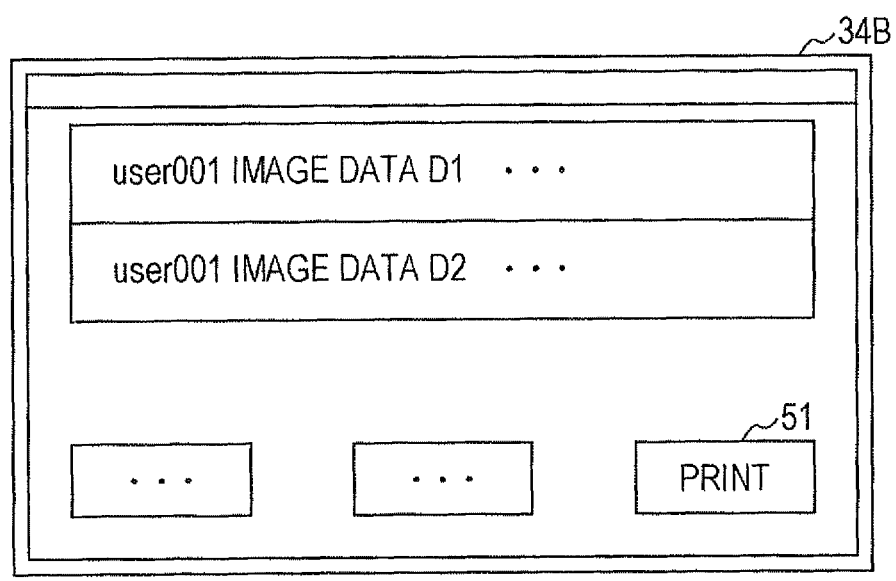
FIG. 10 illustrates an example of listing of print data of the modification of the image forming apparatus.

FIG. 10 illustrates the list of print data of the modification. The list of print data includes as the attribute information of the first print data the user ID "user001," and the file name of the image data D1, and as the attribute information of the second print data the user ID "user001," and the file name of the image data D2. The first print data and the second print data are stored on the different storage locations. The attribute information of the first print data and the attribute information of the second print data are listed next to each other in a layout. The layout gives an impression as if the attribute information of the first print data and the attribute information of the second print data were stored on the same storage location. Even if the second print data is stored on the image forming apparatus 30B, the attribute information of the first print data and the attribute information of the second print data are displayed as listed in FIG. 10.

Eleventh Modification

The identification information of the user is not limited the user ID. The identification information of the user may be a card ID. As described above, one IC card is given to one user. The card ID may be used as the identification information identifying each user. A conversion table mapping the card ID to the user ID is stored on one of the image forming apparatus 30 and the authentication server apparatus 10. One of the image forming apparatus 30 and an authentication server apparatus 10 converts the card ID into the user ID using the conversion table. The identification information of the user may be a value into which the user ID is converted in accordance with a predetermined rule such as a hash function.

Twelfth Modification

In the exemplary embodiment, the spooler information indicating the two storage locations is set in the printer driver 42. The number of storage locations is not limited to two. Alternatively, the spooler information indicating one storage location may be set in the printer driver 42. The spooler information indicating three or more storage locations may be set in the printer driver 42. If multiple storage locations are set, the controller 31 may access successively the multiple storage locations one by one or all the storage locations at a time in step S22.

Thirteenth Modification

The authentication of the user may be performed without using the IC card. For example, the user may enter the user's own ID and password using the UI unit 34 in the image forming apparatus 30. Biometric information such as fingerprint may be used in place of the user ID and password. In such a case, the image forming apparatus 30 includes a device reading the biometric information.

Fourteenth Modification

The image forming apparatus 30 may be a printer that forms an image in a method other than the electrophotographic method. The image forming apparatus 30 may form a monochrome image or a color image. The image forming apparatus 30 may have a copying function and a scanning function.

Fifteenth Modification

The program executed by each of CPU 11, CPU 21, and CPU 37 may be supplied in a recorded state on a recording medium such as magnetic tape, magnetic disk, flexible disk, optical disk, magneto-optical disk, or memory. The program may be then installed onto one of the authentication server apparatus 10, the client apparatus 20, and the image forming apparatus 30. The program may be downloaded onto one of the authentication server apparatus 10, the client apparatus 20, and the image forming apparatus 30 via a communication line such as the Internet.

Sixteenth Modification

The authentication server apparatus 10 is not limited to the type that provides service via cloud computing. For example, the authentication server apparatus 10, the client apparatus 20, and the image forming apparatus 30 may be interconnected to each other via a local area network (LAN), and the authentication server apparatus 10 may provide service via the LAN. The authentication server apparatus 10 may be run by the same entity as the entity which runs the client apparatus 20 and the image forming apparatus 30.

Seventeenth Modification

In the exemplary embodiment, the authentication information 41 transmitted from the authentication server apparatus 10 is stored on the memory 38 of the image forming apparatus 30. The storage destination of the authentication information 41 is not limited to the memory 38. Alternatively, the authentication information 41 may be stored on the storage unit 33.

Eighteenth Modification

Only the user ID of the user may be stored on the IC card. In this case, only the user ID is input to the image forming apparatus 30. The user is authenticated by checking the input user ID against only the user ID included in the authentication information 41.

Nineteenth Modification

In the exemplary embodiment, the list of print data is displayed after the storage location is identified in step S21. The print data selected by the user is retrieved. The image forming apparatus 30 may retrieve the print data without displaying the list of print data. In this case, the image forming apparatus 30 identifies the storage location in step S21, and retrieves the print data from the identified storage location. If the print data is retrieved, the image forming apparatus 30 forms an image responsive to the print data. The operation of retrieving the attribute information in step S22 and the operation of displaying the list of print data in step S23 are not performed. The user is freed from selecting the print data.

Twentieth Modification

The image forming apparatus 30B may receive an operation of deleting the print data when the list of print data is displayed in step S23. In this case, a "DELETE" button instructing the print data to be deleted is displayed on the UI unit 34. Using the UI unit 34, the user may select the print data to be deleted from the list of print data, and then press the "DELETE" button. If the "DELETE" button is pressed, the image forming apparatus 30B requests the image forming apparatus 30A storing the selected print data to delete the print data. Upon receiving the request, the image forming apparatus 30A deletes the print data from the storage unit 33A.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming system, comprising:
a management apparatus; and
a transmitter; and
a plurality of image forming apparatuses,
wherein the management apparatus includes:
    a first storage unit that stores authentication information including identification information and storage information with the identification information mapped to the storage information, the identification information identifying a user, the storage information indicating a storage location of each of the image forming apparatuses where image data corresponding to the identification information is stored, the storage information being preset for each user;
    an extract unit that extracts from the stored authentication information in the first storage unit, the storage information corresponding to the identification information sent from each of the image forming apparatuses; and
    a transmit unit that transmits to each of the image forming apparatuses the extracted storage information;
wherein each of the image forming apparatuses includes:
    an image data storage unit that stores an image data;
    an authentication request unit that requests to the management apparatus to authenticate the user by transmitting the identification information to the management apparatus;
    a receive unit that receives the storage information from the management apparatus;
    an identifying unit that identifies the storage location of another one of the image forming apparatuses storing the image data corresponding to the identification information;
    a retrieval unit that retrieves, from the storage location of the another one of the image forming apparatuses identified by the identifying unit, the image data corresponding to the identification information; and
    an image forming unit that forms an image responsive to the image data retrieved by the retrieval unit,
wherein the transmitter transmits the image data corresponding to the identification information to the storage locations in the image forming apparatuses,
wherein the first storage unit stores the storage information indicating the plurality of storage locations;
wherein the identifying unit identifies the plurality of storage locations indicated by the storage information stored and mapped to the input identification information; and
wherein the retrieval unit retrieves the image data corresponding to the identification information from the storage location that stores the image data corresponding to the identification information, from among the plurality of storage locations identified by the identifying unit,
wherein the plurality of storage locations have different priority levels which are set in the transmitter, and
when the retrieval unit cannot retrieve the image data from the one of the storage locations having a highest one of the priority levels, the retrieval unit retrieves the image data from one of the storage locations having a second highest one of the priority levels.

2. The image forming system according to claim 1, each of the image forming apparatuses further comprising a second storage unit that stores the retrieved identification information and storage information,
wherein the identifying unit identifies the storage location in response to the storage information stored on the second storage unit if the second storage unit stores the storage information.

3. The image forming system according to claim 1, wherein in order to transmit the image data corresponding to the identification information to a given storage location, the transmitter transmits the image data to another storage location, in addition to the given storage location, from among the plurality of storage locations.

4. The image forming system according to claim 1, further comprising a storage device, the storage device including a storage location that stores the image data transmitted by the transmitter, and a transmitter unit that makes a copy of the image data and transmits the copy to another storage location from among the plurality of storage locations.

5. An image forming system, comprising:
a management apparatus;
a transmitter; and
a plurality of image forming apparatuses,
wherein the management apparatus includes:
    a storage unit that stores authentication information including identification information and storage information with the identification information mapped to the storage information, the identification information identifying a user, the storage information indicating a storage location of each of the image forming apparatuses where image data corresponding to the identification information is stored, the storage information being preset for each user;
    an extract unit that extracts from the stored authentication information in the storage unit the storage information corresponding to the identification information sent from each of the image forming apparatuses; and
    a transmit unit that transmits to each of the image forming apparatuses the extracted storage information;
wherein each of the image forming apparatuses includes:
    an image data storage unit that stores an image data;
    an authentication request unit that requests to the management apparatus to authenticate the user by transmitting the identification information to the management apparatus;
    a receive unit that receives the storage information from the management apparatus;
    an identifying unit that identifies the storage location of another one of the image forming apparatuses storing the image data corresponding to the identification information;
    a retrieval unit that retrieves, from the storage location of the another one of the image forming apparatuses identified by the identifying unit, the image data corresponding to the identification information; and
    an image forming unit that forms an image responsive to the image data retrieved by the retrieval unit,
wherein the transmitter transmits the image data corresponding to the identification information to the storage locations in the image forming apparatuses,
wherein the storage unit stores the storage information indicating the plurality of storage locations;

wherein the identifying unit identifies the plurality of storage locations indicated by the storage information stored and mapped to the input identification information; and wherein the retrieval unit retrieves the image data corresponding to the identification information from the storage location that stores the image data corresponding to the identification information, from among the plurality of storage locations identified by the identifying unit, wherein the plurality of storage locations have different priority levels which are set in the transmitter, and when the retrieval unit cannot retrieve the image data from the one of the storage locations having a highest one of the priority levels, the retrieval unit retrieves the image data from one of the storage locations having a second highest one of the priority levels.

6. A non-transitory computer readable medium storing a program causing a system to execute a process for forming an image, the system including:

a management apparatus;

a transmitter; and a plurality of image forming apparatuses, each including an image data storage unit that stores an image data, wherein the management apparatus includes a storage unit that stores identification information and storage information with the identification information mapped to the storage information, the identification information identifying a user, the storage information indicating a storage location where image data corresponding to the identification information is stored, the storage information being preset for each user, the process comprising:

extracting from the stored authentication information in the storage unit the storage information corresponding to the identification information sent from each of the image forming apparatuses;

transmitting to each of the image forming apparatuses the extracted storage information;

requesting the management apparatus to authenticate the user by transmitting the identification information to the management apparatus;

receiving the storage information from the management apparatus;

identifying the storage location of another one of the image forming apparatuses storing the image data corresponding to the identification information;

retrieving, from the identified storage location of the another one of the image forming apparatuses, image data corresponding to the identification information; and forming an image responsive to the retrieved image data, transmitting the image data corresponding to the identification information with the transmitter to the storage locations in the image forming apparatuses, storing in the storage unit the storage information indicating the plurality of storage locations;

identifying the plurality of storage locations indicated by the storage information stored and mapped to the input identification information; and retrieving the image data corresponding to the identification information from the storage location that stores the image data corresponding to the identification information from among the plurality of storage locations identified, wherein the plurality of storage locations have different priority levels which are set in the transmitter, and when the image data cannot be retrieved from the one of the storage locations having a highest one of the priority levels, the image data is retrieved from one of the storage locations having a second highest one of the priority levels.

* * * * *